United States Patent
Masri et al.

(10) Patent No.: US 7,302,691 B2
(45) Date of Patent: Nov. 27, 2007

(54) SCALABLE LOW BANDWIDTH MULTICAST HANDLING IN MIXED CORE SYSTEMS

(75) Inventors: Nabil N. Masri, Sunnyvale, CA (US); Wolf-Dietrich Weber, San Jose, CA (US); Chien-Chun Chou, San Jose, CA (US); Drew Eric Wingard, San Carlos, CA (US)

(73) Assignee: Sonics, Incorporated, Mountain View, CA (US)

( * ) Notice: Subject to any disclaimer, the term of this patent is extended or adjusted under 35 U.S.C. 154(b) by 781 days.

(21) Appl. No.: 10/144,073

(22) Filed: May 10, 2002

(65) Prior Publication Data

US 2003/0212743 A1  Nov. 13, 2003

(51) Int. Cl.
*G06F 3/00* (2006.01)
*G06F 9/44* (2006.01)
*G06F 9/46* (2006.01)
*G06F 13/00* (2006.01)

(52) U.S. Cl. ............ 719/319; 709/202; 709/215; 709/220; 719/313

(58) Field of Classification Search ............ 709/220, 709/223, 245, 248, 201, 204, 238, 203, 202, 709/232, 215; 398/66; 455/519, 3.02, 500; 710/100; 719/311, 317, 319, 313
See application file for complete search history.

(56) References Cited

U.S. PATENT DOCUMENTS

| | | | | |
|---|---|---|---|---|
| 5,361,256 A * | 11/1994 | Doeringer et al. | .......... | 370/390 |
| 5,517,494 A * | 5/1996 | Green | .......... | 370/408 |
| 5,655,079 A * | 8/1997 | Hirasawa et al. | .......... | 709/245 |
| 5,727,002 A * | 3/1998 | Miller et al. | .......... | 714/748 |
| 5,751,971 A * | 5/1998 | Dobbins et al. | .......... | 709/238 |
| 5,944,779 A * | 8/1999 | Blum | .......... | 709/201 |
| 5,948,089 A | 9/1999 | Wingard et al. | | |
| 6,049,546 A * | 4/2000 | Ramakrishnan | .......... | 370/412 |
| 6,101,551 A * | 8/2000 | Kanoh | .......... | 709/245 |
| 6,182,183 B1 | 1/2001 | Wingard et al. | | |
| 6,192,417 B1 * | 2/2001 | Block et al. | .......... | 709/249 |
| 6,216,167 B1 * | 4/2001 | Momirov | .......... | 709/238 |
| 6,249,820 B1 * | 6/2001 | Dobbins et al. | .......... | 709/238 |
| 6,269,376 B1 * | 7/2001 | Dhillon et al. | .......... | 707/101 |
| 6,307,861 B1 * | 10/2001 | Hogg et al. | .......... | 370/432 |
| 6,330,225 B1 | 12/2001 | Weber et al. | | |
| 6,335,812 B1 * | 1/2002 | Matsubara et al. | .......... | 398/126 |
| 6,353,596 B1 * | 3/2002 | Grossglauser et al. | .......... | 370/256 |
| 6,412,002 B1 * | 6/2002 | Denman et al. | .......... | 709/224 |

(Continued)

OTHER PUBLICATIONS

Wingard, Drew: "MicroNetwork-Based Integration for SOCs", Design Automation Conference, Jun. 2001, pp. 673-677.

(Continued)

*Primary Examiner*—Michael Won
(74) *Attorney, Agent, or Firm*—Blakely, Sokoloff, Taylor & Zafman LLP (57) ABSTRACT

Embodiments of methods and apparatuses for multicast handling in mixed core systems have been described. A method for multicast handling in mixed core systems includes configuring broadcast group registers located in targets. The method also includes receiving a request to create a broadcast group and creating the broadcast group. Finally, the method includes transmitting the broadcast group to targets with broadcast group registers that correspond to the broadcast group.

38 Claims, 11 Drawing Sheets

U.S. PATENT DOCUMENTS

| | | | |
|---|---|---|---|
| 6,418,514 B1* | 7/2002 | Arimilli et al. | 711/133 |
| 6,473,829 B1* | 10/2002 | Dahman et al. | 711/112 |
| 6,578,117 B2 | 6/2003 | Weber | |
| 6,684,331 B1* | 1/2004 | Srivastava | 713/163 |
| 6,711,163 B1* | 3/2004 | Reid et al. | 370/390 |
| 6,725,313 B1 | 4/2004 | Wingard et al. | |
| 6,745,240 B1* | 6/2004 | Denman et al. | 709/220 |
| 6,785,753 B2 | 8/2004 | Weber et al. | |
| 6,801,950 B1* | 10/2004 | O'Keeffe et al. | 709/238 |
| 6,804,738 B2 | 10/2004 | Weber | |
| 6,804,757 B2 | 10/2004 | Weber | |
| 6,850,987 B1* | 2/2005 | McCanne et al. | 709/238 |
| 6,901,058 B2* | 5/2005 | Lalwaney | 370/320 |
| 6,914,883 B2* | 7/2005 | Dharanikota | 370/230.1 |
| 6,917,985 B2* | 7/2005 | Madruga et al. | 709/238 |
| 6,951,020 B2* | 9/2005 | Ricciardi | 719/314 |
| 6,961,834 B2 | 11/2005 | Weber | |
| 6,977,924 B1* | 12/2005 | Skoog | 370/359 |
| 7,028,218 B2* | 4/2006 | Schwarm et al. | 714/11 |
| 7,058,010 B2* | 6/2006 | Chidambaran et al. | 370/218 |
| 7,065,066 B2* | 6/2006 | Mizutani et al. | 370/338 |
| 7,079,502 B2* | 7/2006 | Yamano et al. | 370/312 |
| 7,079,535 B2* | 7/2006 | Kim | 370/390 |
| 7,120,712 B2 | 10/2006 | Wingard et al. | |
| 2002/0114286 A1* | 8/2002 | Iwamura et al. | 370/252 |

OTHER PUBLICATIONS

"Open Core Protocol Specification", OCP International Partnership, Release 1.0, 2001.

* cited by examiner

SCALABLE LOW BANDWIDTH MULTICAST HANDLING IN MIXED CORE SYSTEMS

FIELD OF THE INVENTION

The present invention pertains to communication. More particularly, the present invention relates to a method and apparatus for multicast handling in mixed core systems.

BACKGROUND OF THE INVENTION

In communication and/or computer systems, it is common for data or information to be sent to multiple destinations or targets. This is may be accomplished by using a broadcast command to notify all targets that they are the intended recipients of the data. However, if only a subset of targets are the intended recipients then it is common to replicate the data and then send multiple requests on the interconnect for each intended target. These multiple requests on the interconnect may consume additional time, additional bandwidth, and additional system resources. This may present a problem.

BRIEF SUMMARY OF THE INVENTION

The present disclosure relates to a method and apparatus for multicast handling in mixed core systems. In certain embodiments of the present disclosure, a method, includes creating a request from an initiator in a network having a broadcast group. Broadcast group registers associated with a first plurality of agents located on a chip are configured to store an associated value for the broadcast group and each agent is associated with at least one targe. The method further includes sending the request to the first plurality of agents in the network. The network includes the initiator and the first plurality of agents and associated targets is located within a single device. The method further includes determining for each agent whether to accept the request for each agent based on the current value of the broadcast group and the previously stored value of the broadcast group register associated with each agent. At least one agent ignores the request based on the current value of the broadcast group not matching the previously stored value of the broadcast group register associated with the at least one agent such that each target associated with the at least one agent does not receive the request.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for scalable low bandwidth multicast handling in mixed core systems are described.

Figure 1:
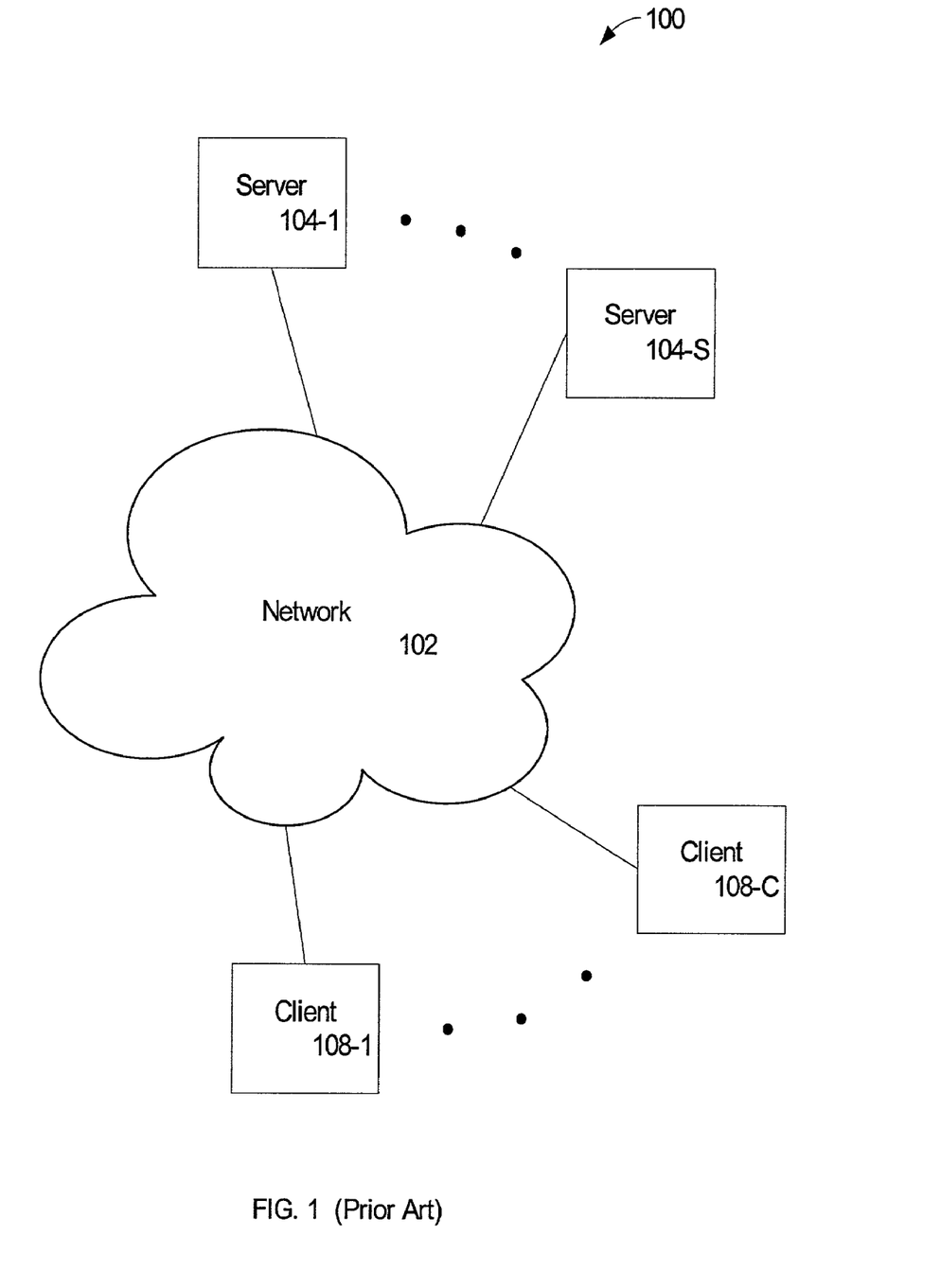
FIG. 1 illustrates a network environment in which the method and apparatus of the present invention may be implemented.

FIG. 1 illustrates a network environment 100 in which the techniques described may be applied. The network environment 100 has a network 102 that connects S servers 104-1 through 104-S, and C clients 108-1 through 108-C. More details are described below.

Figure 2:
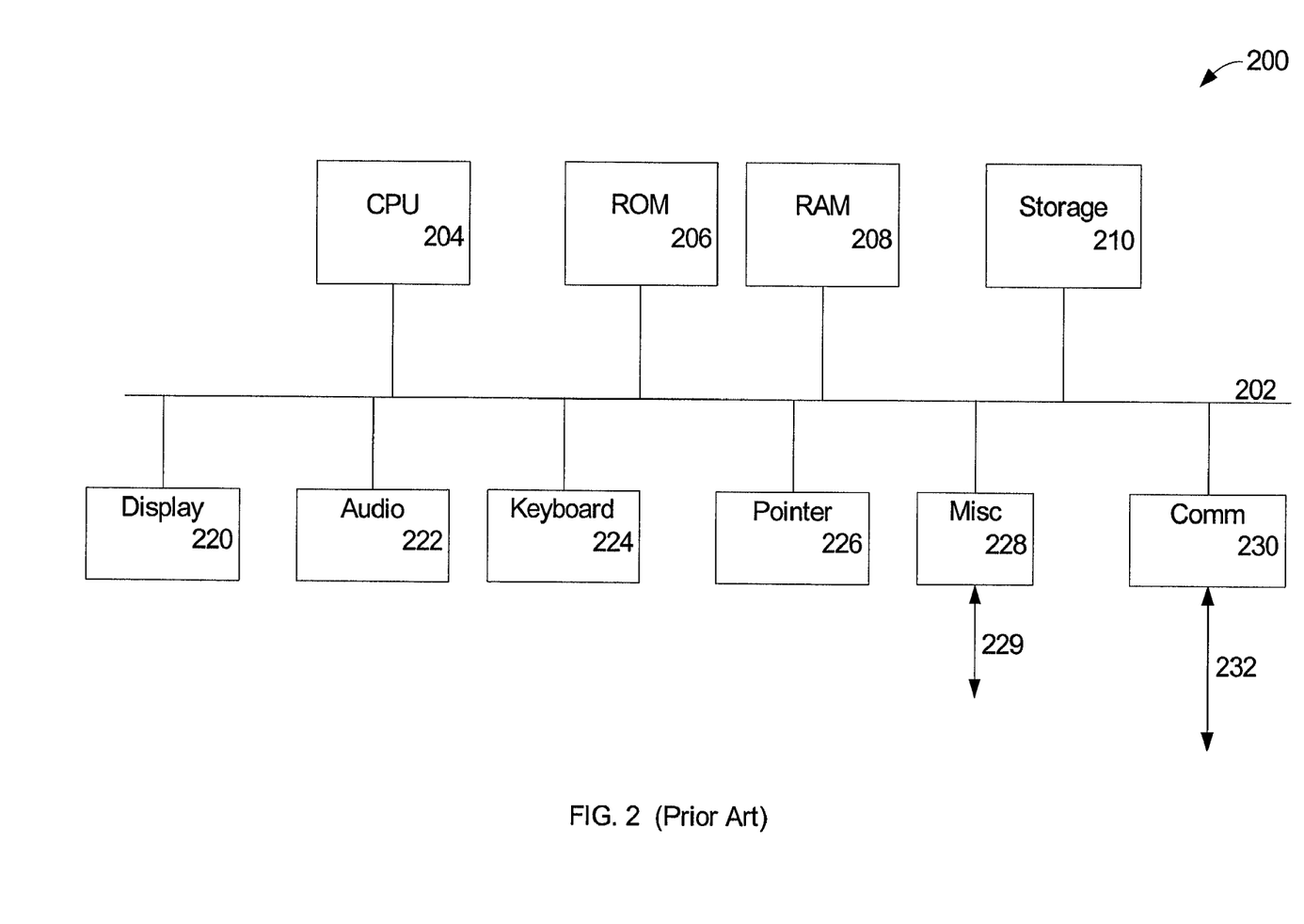
FIG. 2 is a block diagram of a computer system.

FIG. 2 illustrates a computer system 200 in block diagram form, which may be representative of any of the clients and/or servers shown in FIG. 1. More details are described below.

The present invention, in one embodiment, deals with a technique to extend the broadcast semantics to specify a subset of all possible targets in a system. In yet another embodiment of the present invention, the technique described applies to any system where a request needs to be sent to multiple targets. In yet another embodiment of the present invention, is described a technique to minimize the interconnect bandwidth needed to make the transfer, and for the transfer to complete in all agents substantially simultaneously.

Figure 3:
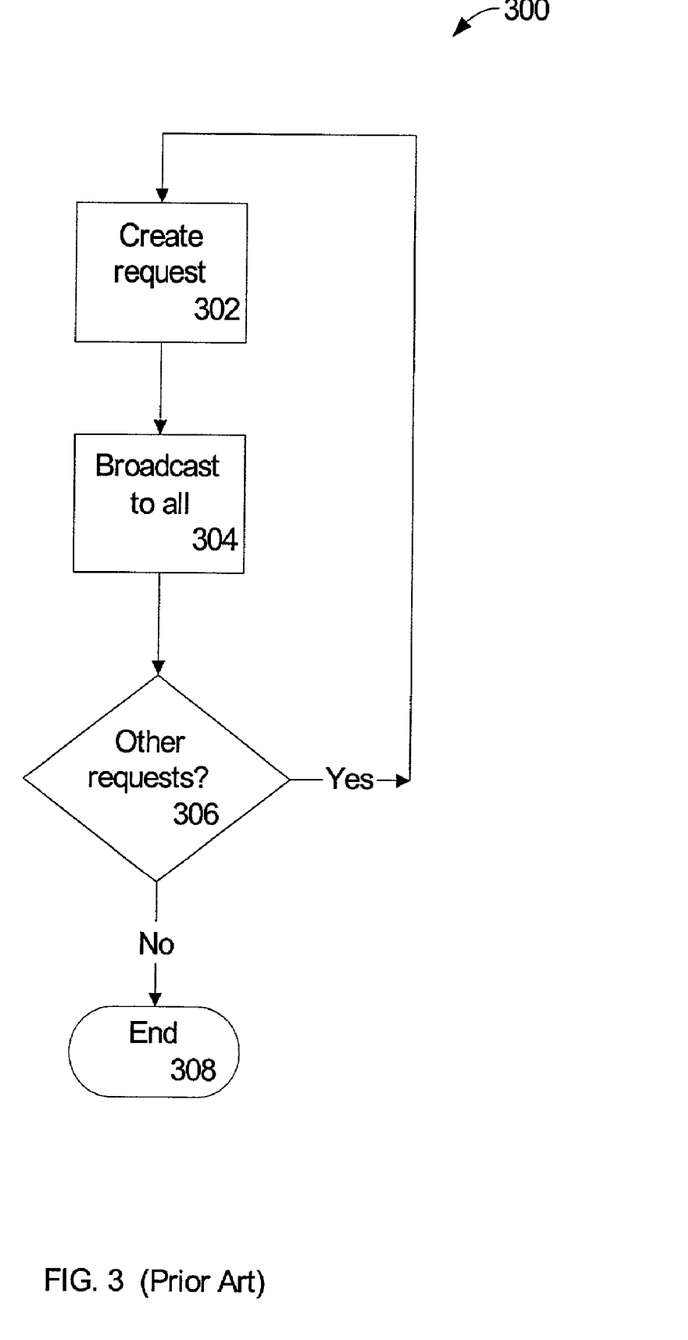
FIG. 3 shows an older method for reaching all targets.

FIG. 3 shows an older method 300 for reaching all targets. Note that this method cannot reach a subset only, and requires that the targets have a "broadcast" understanding. At 302 a request is created, at 304 the request is broadcast to all targets. At 306 a check is made to see if there are other requests. If there are no other requests, then the method is ended 308. If there are other requests (as checked at 306), then loop back to 302 and create a request.

Figure 4:
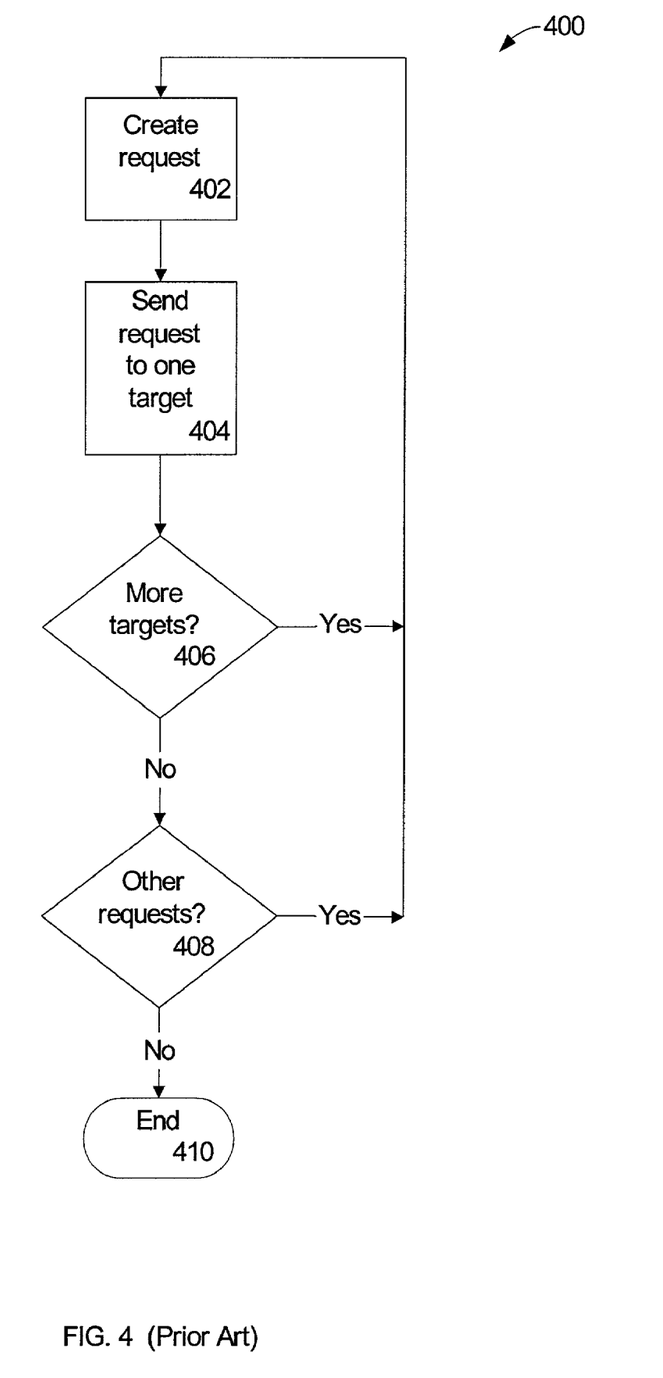
FIG. 4 shows an older method for reaching multiple targets.

FIG. 4 shows an older method 400 for reaching multiple targets. Note that this method uses two loops and requires multiple sending of a single request (one to each target). At 402 a request is created, at 404 the request is sent to one of the targets. At 406 a check is made to see if there are other targets. If there are other targets (as checked at 406), then loop back to 402 and create a request. If there are no other targets for this request (as checked at 406), then at 408 a check is made to see if there are any more requests 408. If there are no more requests (as checked at 408), then the method is ended 410. If at 408 there are more requests, then loop back to 402 and create a request.

Figure 5:
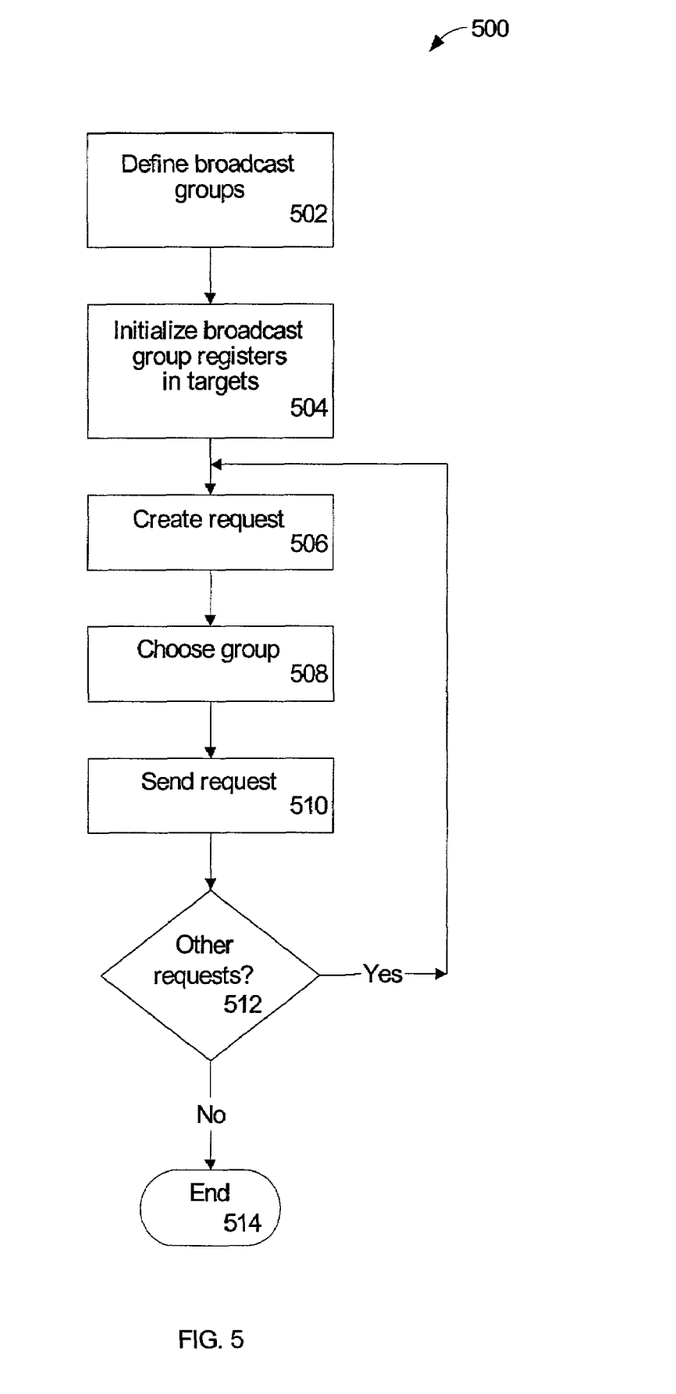
FIG. 5 illustrates one embodiment of the present invention for reaching multiple different targets using one request.

FIG. 5 illustrates one embodiment 500 of the present invention for reaching multiple different targets using one request. At 502 broadcast groups are defined. At 504 broadcast group registers in targets are defined. At 506 a request is created, at 508 the broadcast group is chosen, and at 510 the request is sent. At 512 a check is made to see if there are other requests. If there are no other requests, then the method is ended 514. If there are other requests (as checked at 512), then loop back to 506 and create a request.

Figure 6:
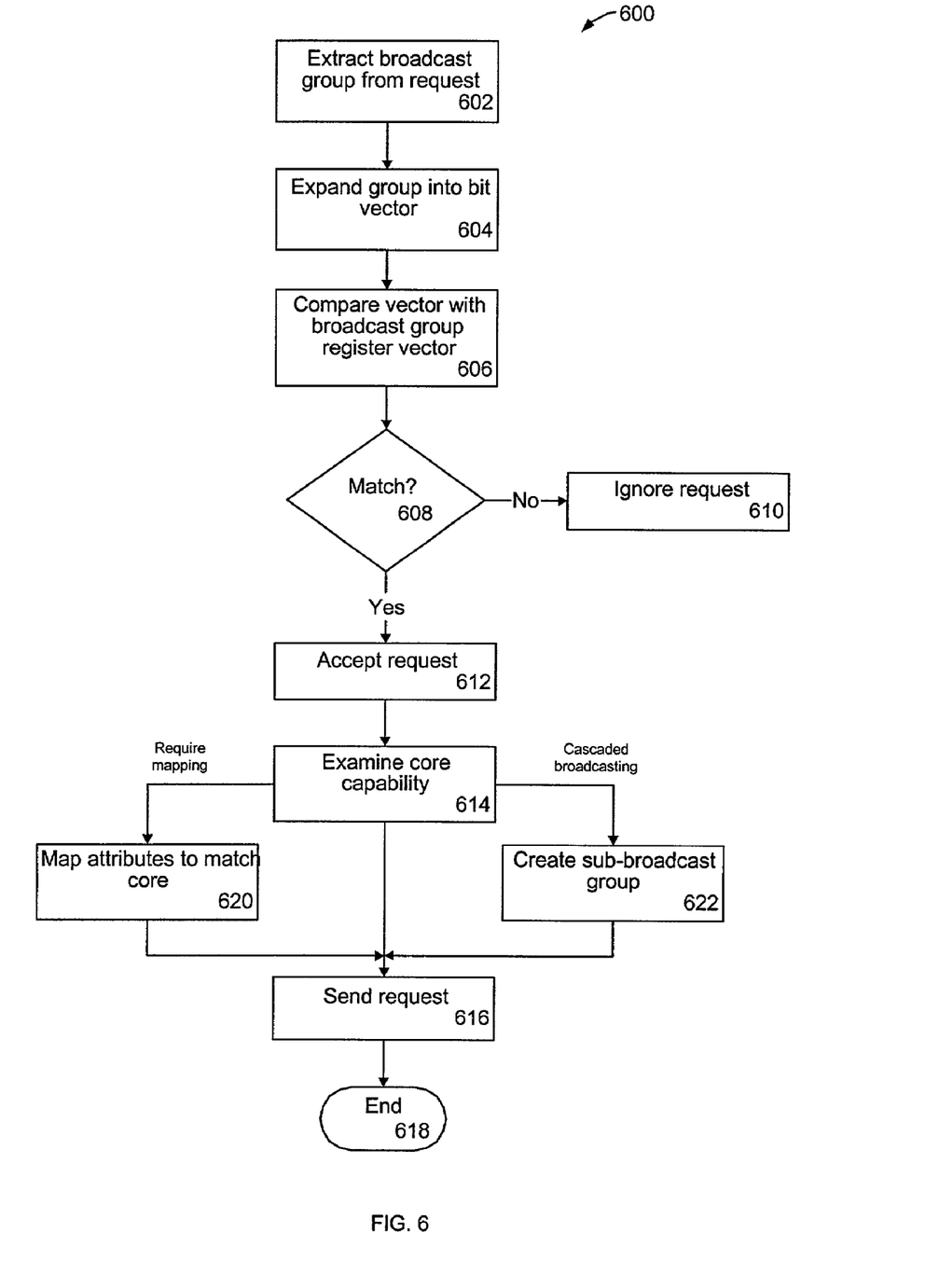
FIG. 6 illustrates one embodiment of the present invention where multiple targets accept the request.

FIG. 6 illustrates one embodiment 600 of the present invention where multiple targets accept the request. At 602 the broadcast group is extracted from the request, then the broadcast group is expanded into a bit vector 604, and at 606 the broadcast group bit vector is compared with a broadcast group register vector. Next, a check is made to see if the comparison at 606 results in a match 608. If the is no match, then other operations may be done, for example at 610 the request is ignored. If there is a match at 608, then the request is accepted 612. Next, the request accepted (at 612) is examined with respect to the core capability 614. The result of this examination (at 614) is one of three results. If the result is that the core requires mapping, then at 620 the attributes are mapped to match the core 620, the mapped attributes request is sent 616, and process is ended 618. If the result of this examination (at 614) is that a cascaded broadcast is needed, then at 622 sub-broadcast groups are created, the sub-broadcast groups request is sent 616, and process is ended 618. If neither a mapping nor broadcast is needed (as determined at 614), then the request is sent 616, and the process is ended 618.

In one embodiment of the present invention, a system may be comprised of multiple cores that communicate over an interconnect. Attached to each core may be an agent that communicates on each core's behalf over the interconnect. Broadcast groups are defined to indicate whether an agent is the intended target for a broadcast command. Some bits of the address may be used to indicate a broadcast group. Each agent may be part of one or more target groups. The set of target groups that an agent is part of is determined via a bit vector stored in configuration registers called broadcast group registers. These registers may be local to each agent. Each agent decodes the address bits and compares the result with the values stored in the broadcast group registers; if the corresponding bit is set, then the agent is an intended target for the request otherwise it is not.

Figure 7:
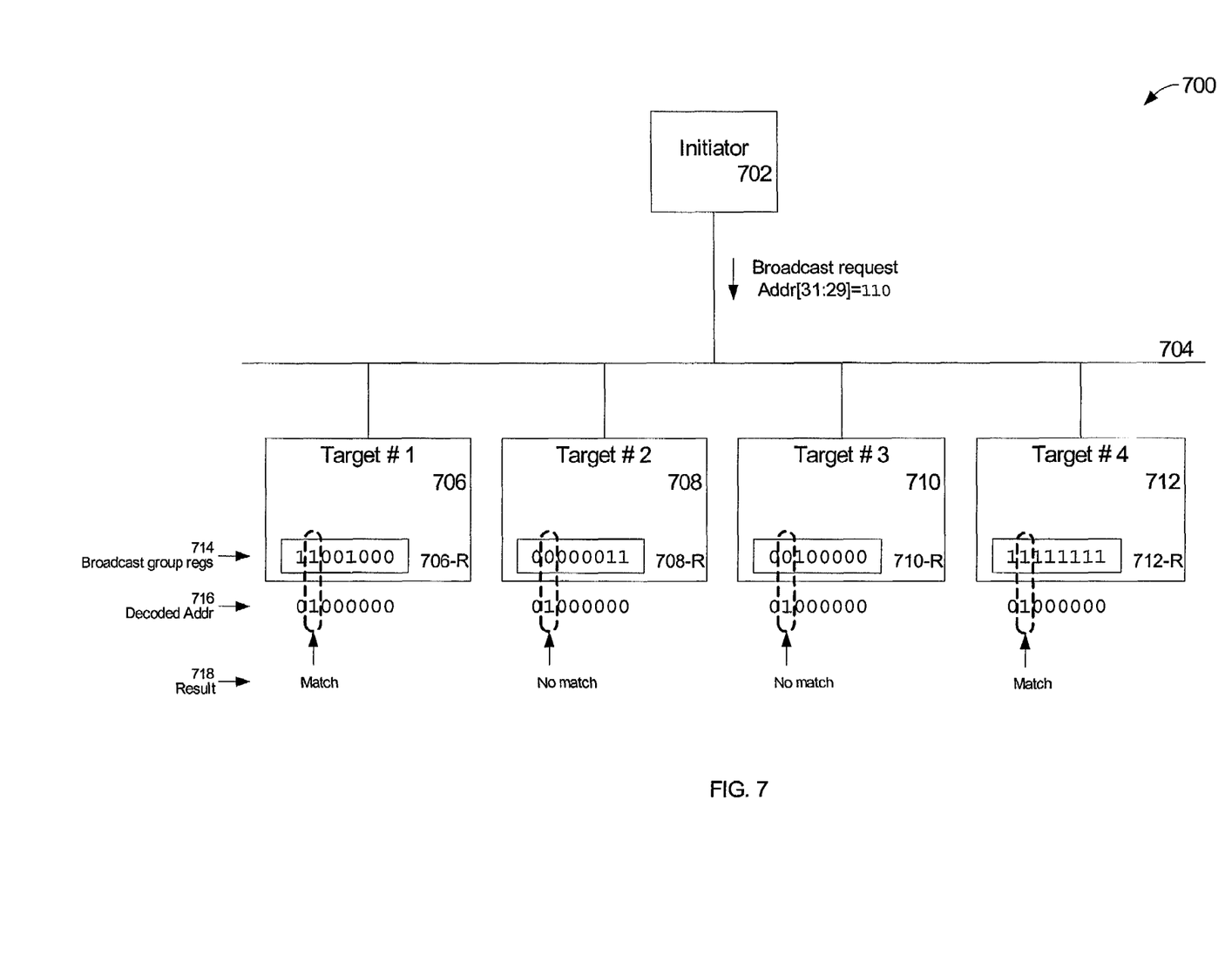
FIG. 7 shows an example of one embodiment of the present invention accessing two agents out of the four possible target agents in the system.

FIG. 7 shows an example of one embodiment 700 of the present invention accessing two agents (706 and 712) out of the four possible target agents (706, 708, 710, and 712) in the system. The set of targets to be addressed by a broadcast command (from for example, Initiator 702) is defined by setting up the broadcast group registers in each agent (706-R, 708-R, 710-R, and 712-R respectively for targets 706, 708, 710, and 712). The first agent's (Target #1, 706) broadcast group register 706-R indicates it is part of groups 3, 6 and 7 (MSB . . . LSB order); agent 2 (708) is part of groups 0 and 1 (see 708-R); agent 3 (710) is part of group 5 (see 710-R); and agent 4 (712) is part of all possible groups (see 712-R). In this example, it is assumed that there are a maximum of 8 groups however this may scale up/down to any number. For example, the three top most address bits (MSB) of the broadcast request is 110 indicating that all targets that are part of group 6 are the intended targets. As a result, agents 1 (706) and 4 (712) will pick up the request but the other agents (708 and 710) won't. As illustrated, the Initiator 702 broadcasts a request with Addr[31:29]=110. The initiator and targets communicate via link 704. The decoded broadcast address (Addr[31:29]=110) (assuming in this example a 32 bit address) is shown at the row denoted 716. Broadcast registers are shown (for targets 1-4) in the row denoted at 714. Row 718 denotes the result of the broadcast group address and the broadcast group registers. Note that in this example embodiment of the present invention, the broadcast request was on the upper address lines. Other embodiments may also be used, for example, other address lines, data lines, control lines, out-of-band lines, dedicated lines, etc.

Figure 8:
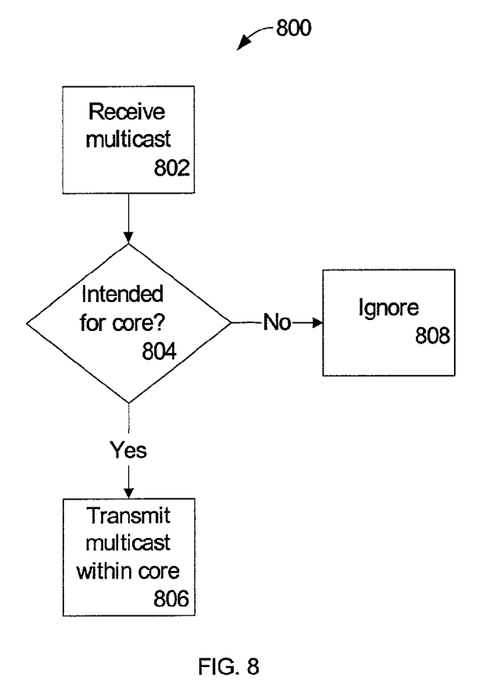
FIG. 8 illustrates on embodiment of the present invention for cascade multicasting.

FIG. 8 illustrates on embodiment 800 of the present invention for cascade multicasting. At 802 a multicast is received, at 804 a check is made to see if the multicast is intended for the core. If the multicast is not intended for the core then the multicast is ignored 808. If the multicast is intended for the core (as determined at 804), then the multicast is transmitted within the core 806. This process (FIG. 8) may be cascaded for blocks or regions of a core. That is, a receiver of the transmitted multicast with the core (like from 806), may then treat this as a received a multicast (like at 802) and "cascade" the multicast on. Another example of cascade multicasting was discussed above as illustrated in FIG. 6 at 622 where sub-broadcast groups are created. Recall, if the result of the examination at 614 was that a cascaded broadcast was needed, then at 622 sub-broadcast groups are created, the sub-broadcast groups request is sent 616, and process is ended 618.

Figure 9:
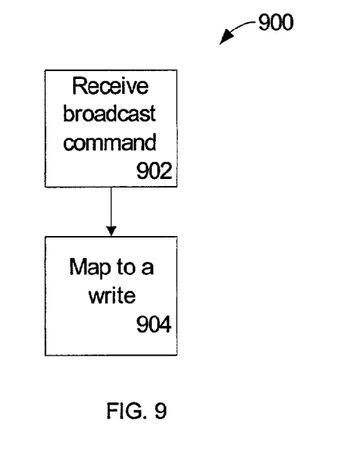
FIG. 9 illustrates one embodiment of the present invention where a broadcast command is received, and then mapped to a write command.

Some devices may not be able to receive a broadcast command and process it. In this case then, a mapping to another command and/or sequence understood by the device may be necessary. FIG. 9 illustrates one embodiment 900 of the present invention where a broadcast command is received 902, and then mapped to a write command 904. Another example of mapping was discussed above as illustrated in FIG. 6 where attributes were mapped to match the core 620.

Figure 10:
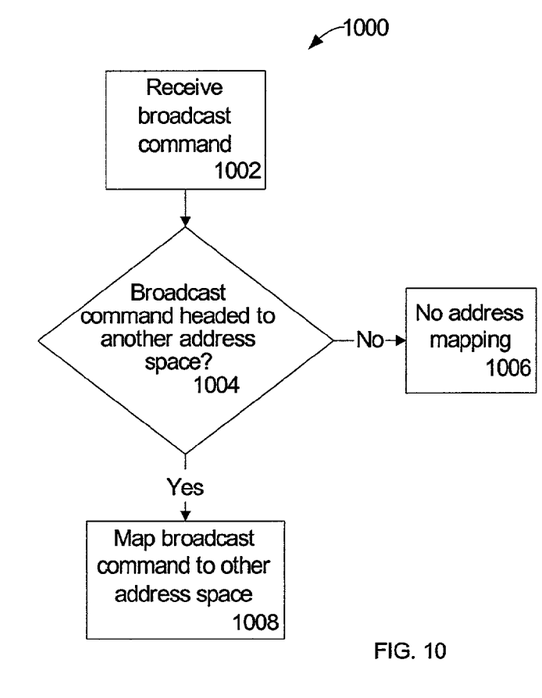
FIG. 10 illustrates one embodiment of the present invention where a broadcast command is mapped to a different address space.

Devices may not reside in the same address space. In this case then, a mapping from one address space to another address space may be necessary. FIG. 10 illustrates one embodiment 1000 of the present invention where a broadcast command is mapped to a different address space 1008. Next a check is made to see if the broadcast command is headed to another address space. If not, then no address mapping is done 1006. If the broadcast command is headed to another address space, then at 1008 the broadcast command is mapped to another address space.

Note also, that a combination of broadcast command mapping and address space mapping may be necessary.

Figure 12:
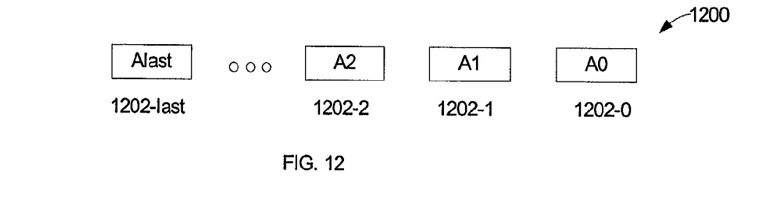
FIG. 12 illustrates one embodiment of the present invention showing a burst.

A burst is an ordered sequence of requests, where the requests have a deterministic address sequence. FIG. 12 illustrates one embodiment 1200 of the present invention showing a burst. Note that the burst has requests that are in an ordered sequence. Being sent in time in the following order are A0, A1, A2, . . . , Alast (1202-0, 1202-1, 1202-2, . . . , 1202-LAST respectively) where A0 is first in time, A1 next, etc.

Figure 13:
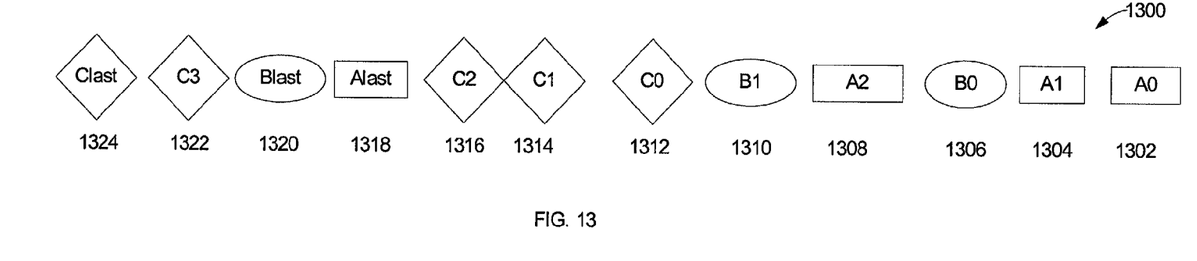
FIG. 13 illustrates one embodiment of the present invention showing burst interleaving.

There is no atomicity guarantee on a burst of requests. On any given physical interface, each request in a burst may be interleaved with other requests from other initiators. FIG. 13 illustrates one embodiment 1300 of the present invention showing burst interleaving. Multiple bursts (A, B, and C) as may be seen are interleaved. A0 1302 is first in time, and Clast is last. The multiple burst in transition are: A0, A1, B0, A2, B1, C0, C1, C2, Alast, Blast, C3, and Clast (1302 through 1324 respectively). In order to tell the requests apart on the interface they are sharing, the concept of a thread is needed. Each open burst is assigned a thread identifier, and so the sequence of requests within a thread (i.e. with the same thread identifier) is still the ordered (non-interleaved) sequence of requests making up the burst. For example, in FIG. 13, burst A may be assigned to thread 1, burst B may be assigned to thread 2, and burst C may be assigned to thread 3. Given this assignment, we will see the sequence A0, A1, A2, Alast on thread 1; B0, B1, and B last on thread 2; and C1, C2, C3, and Clast on thread 3.

Figure 11:
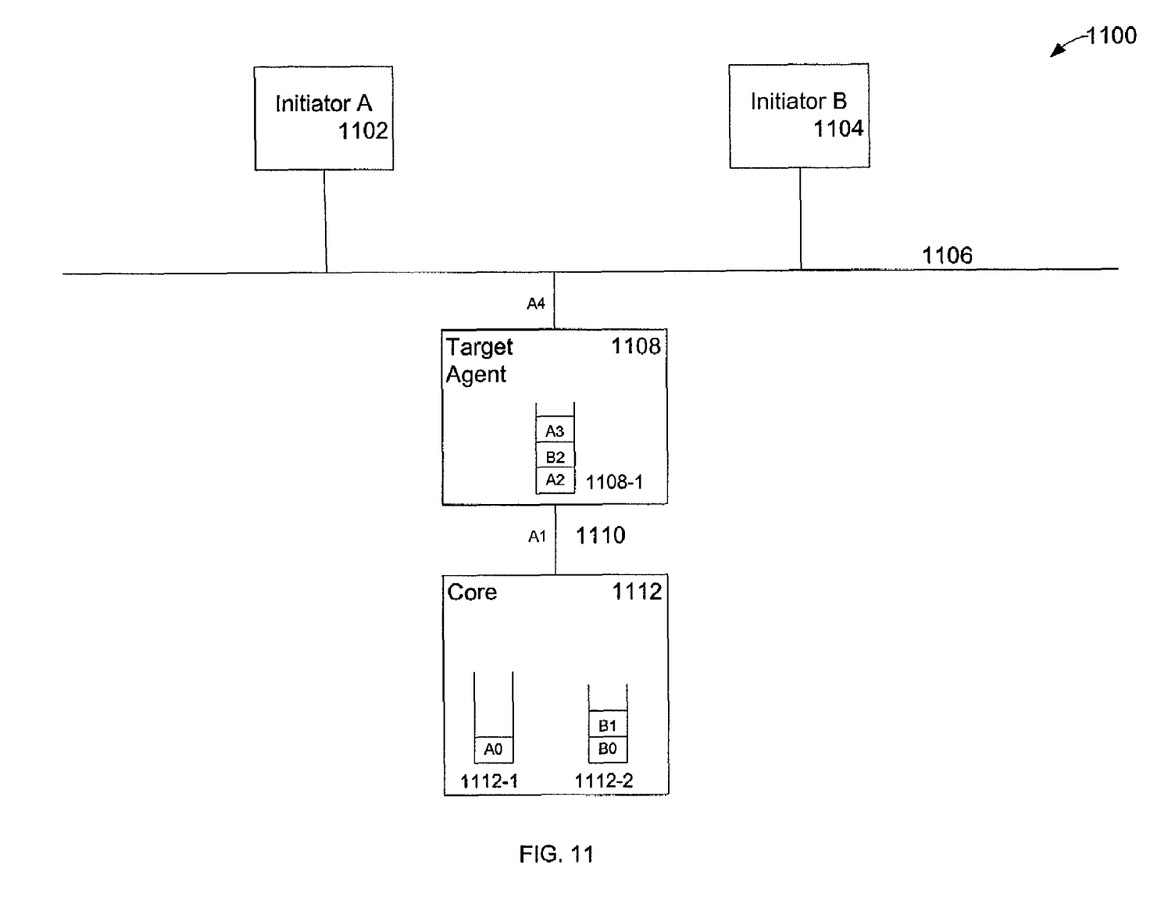
FIG. 11 illustrates one embodiment of the present invention showing an example of two threads interleaved at the target agent.

FIG. 11 illustrates one embodiment 1100 of the present invention showing an example of two bursts (A and B) interleaved on the link 1110 between target agent 1108 and core 1112. Initiator A is sending a burst A0, A1, A2, A3, and A4. Initiator B is sending a burst B0, B1, and B2. The first portion of the burst (A0 at 1112-1, and B0, B1 at 1112-2) is delivered to the target core 1112 before assembling the entire burst (i.e. don't need to assemble all of A0, A1, A2, A3, A4 or B0, B1, B2). The second burst is shown to have transferred to the target agent 1108 (i.e. the Initiator B has sent the entire burst B0, B1, B2 and they have been received by the agent 1108 (some also transferred to the core 1112). As shown in FIG. 11, the Initiators A and B are communicating with the target agent 1108 via link 1106. The target agent 1108 is communicating with the core 1112 via link 1110. At the point in time illustrated in FIG. 11, part of Initiator A's burst, A4 is on the link 1106. That is, it has left Initiator A but has not yet been received by target agent 1108. A1 has been sent by target agent 1108 over link 1110 but has not yet been received by the core 1112. Two threads are needed on link 1110 in order to allow the two bursts A and B to be interleaved on the link, while still maintaining the request sequence within each thread. The queue 1108-1 used to store requests in the target agent for delivery to the core 1112 may or may not be shared amongst threads, depending on the characteristics of the threads.

If the target is guaranteed to always accept certain threads without exerting any backpressure or flow control, then those threads are designated nobackpressure threads. A target agent queue (such as 1108-1 in FIG. 11) may be shared amongst several threads, if those threads are all no-backpressure threads. Sharing a queue saves cost (such as buffer area, logic, power, etc.). Regular threads (i.e. those where the target may exert backpressure or flow control) may not share an agent queue, because one thread could be blocked on the interface and would then impede the progress of all other threads sharing the target agent queue.

Figure 14:
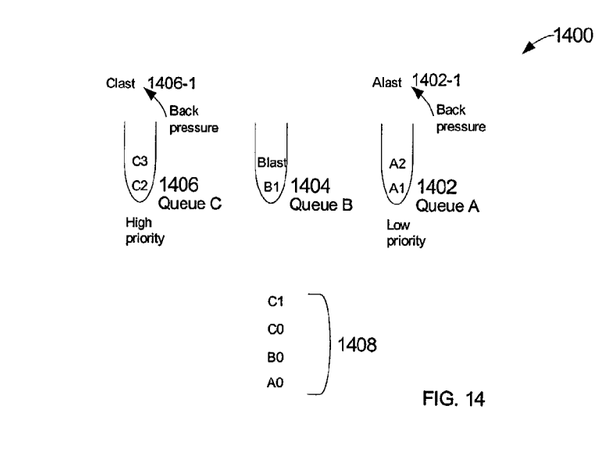
FIG. 14 illustrates one embodiment of the present invention showing multiple queues.

FIG. 14 illustrates one embodiment 1400 of the present invention showing multiple queues (A, B, and C, 1402, 1404, and 1406 respectively). Queues A 1402, B 1404, and C 1406 may be considered part of an agent. There may be a need for multiple queues based upon different quality of server (QOS) requirements. This may result in backpressure, i.e. flow control needing to be implemented. Additionally, if there is a mismatch between input and output rates, this may require backpressure (flow control). In FIG. 14, the QOS is based upon a priority (C at high priority, and A at low priority). Now, using as an example, the multiple burst stream as illustrated in FIG. 13 as being sent to the target agent in FIG. 14 having queues A 1402, B 1404, and C 1406, the following is an explanation. At 1408 is represented what has been previously received into the queues A 1402, B 1404, and C 1406 and is now, for example, being transferred to a core. This sequence is A0, B0, C0, and C1. Now, sitting in the A 1402 low priority queue is A1 and A2. Backpressure is being applied for Alast 1402-1, the remaining (and last) part of burst A. Queue B 1404 has no backpressure and has received all of burst B (B0 having been transferred at 1408). Queue C 1406 has a high priority and is applying backpressure to Clast 1406-1 (the remaining and last part of burst C).

Queues that are servicing no-backpressure threads may be referred to as no-backpressure (NBP) queues and in turn do not exert any backpressure on the initiators that send requests to these queues. Queues servicing other threads may be referred to as backpressure (BP) queues.

Figure 15:
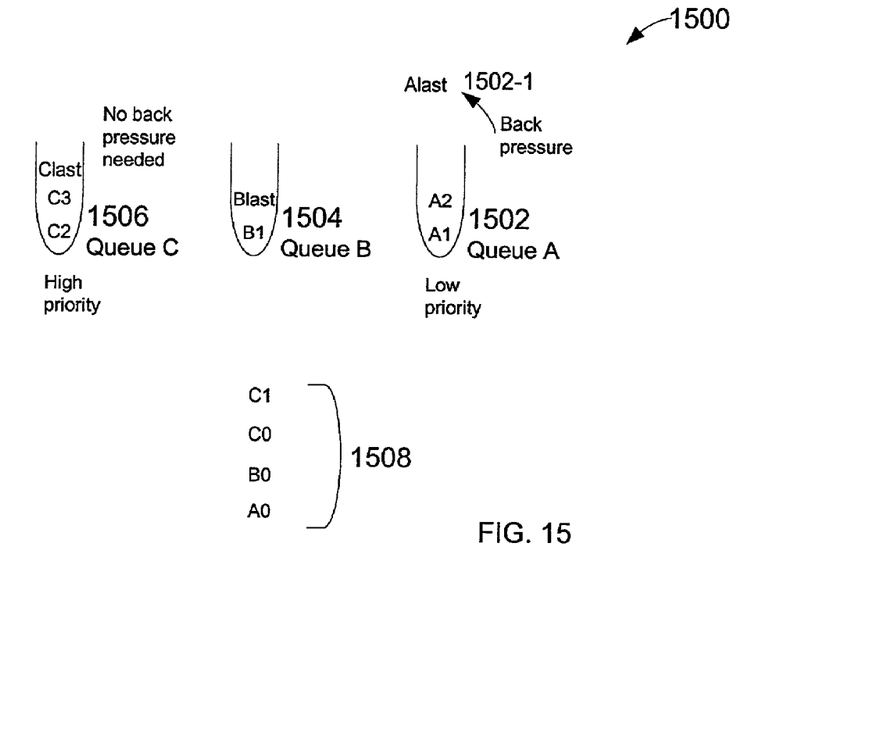
FIG. 15 illustrates another embodiment of the present invention showing multiple queues having mixed nonbackpressure and backpressure threads.

FIG. 15 illustrates another embodiment 1500 of the present invention showing multiple queues (A, B, and C) handling a mixture of nonbackpressure (NBP) and backpressure (BP) threads. Queues A, B, and C may be considered part of an agent. Here, the thread serviced by queue C is assumed to be a no-backpressure thread, and so queue C becomes a no-backpressure queue. So queue C also does not apply any upstream backpressure. It is the system designer's responsibility to ensure that the nobackpressure queue does not overflow. This may be accomplished by various techniques, for example, by matching input and output rates, selecting an appropriate size for queue C 1506 (the high priority queue), etc. Note that backpressure is still needed for queue A 1502, a low priority queue, at 1502-1. As can been seen, at 1508 are queued elements that have been transferred by the agent.

It may be possible for an agent to "combine" two or more NBP queues, thereby saving resources. If the NBP queue has sufficient bandwidth, speed, resources, etc., then a single NBP queue may be able to handle multiple threads.

Figure 16:
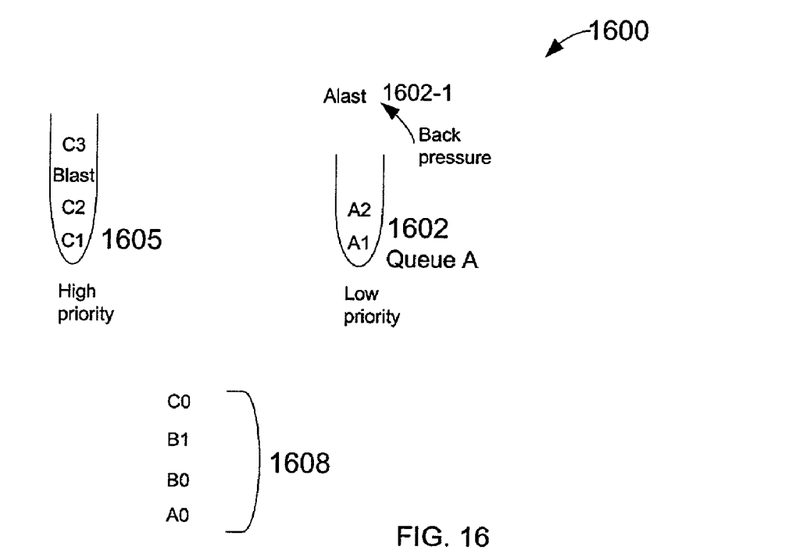
FIG. 16 illustrates another embodiment of the present invention showing multiple queues.

FIG. 16 illustrates another embodiment 1600 of the present invention showing multiple no-backpressure threads sharing a single no-backpressure queue. Threads B and C are both no-backpressure threads and are both handled by queue 1605. This queue is a no-backpressure queue. Note that backpressure is still needed for queue A 1602, a low priority queue, at 1602-1. As can be seen, at 1608 are queued elements that have been transferred by the agent.

One of ordinary skill in the art will appreciate that other and different queue types are also possible. These may be implemented by examining the connection identification, for example. Thus, a mixture of queues may be used to better serve a communication systems requirements. Simple queues may be a FIFO, more sophisticated queues may have scheduling algorithms and consist of memory and/or storage, etc. Many variations are possible.

Note that if the target core can handle the bandwidth of the multicast queue, then by having the target interface arbitration give preference to the multicast queue, it is possible to mix regular threads with multicast threads in the same target agent. A static division of threads into the multicast queue and regular queues may be achieved by, for example, using the top most bit in a connection ID. A connection ID is the thread identifier over the interconnect. The target core must not offer any backpressure to the multicast traffic.

As discussed previously, cores that may not be able to handle broadcasting may still be used with this system by mapping the incoming broadcast command into regular write commands. The same mapping mechanism may also be extended to include the address space as well. The agent acting on behalf of the target core is responsible for the mapping. Cascaded broadcasting may also be supported by passing the broadcast group information to the target core where further sub-broadcast groups can be defined and forwarded.

Thus, what has been disclosed is a method and apparatus for multicast handling in mixed core systems.

Referring back to FIG. 1, FIG. 1 illustrates a network environment 100 in which the techniques described may be applied. The network environment 100 has a network 102 that connects S servers 104-1 through 104-S, and C clients 108-1 through 108-C. As shown, several systems in the form of S servers 104-1 through 104-S and C clients 108-1 through 108-C are connected to each other via a network 102, which may be, for example, an on-chip communication network. Note that alternatively the network 102 might be or include one or more of: inter-chip communications, an optical network, the Internet, a Local Area Network (LAN), Wide Area Network (WAN), satellite link, fiber network, cable network, or a combination of these and/or others. The servers may represent, for example: a master device on a chip; a memory; an intellectual property core, such as a microprocessor, communications interface, etc.; a disk storage system; and/or computing resources. Likewise, the clients may have computing, storage, and viewing capabilities. The method and apparatus described herein may be applied to essentially any type of communicating means or device whether local or remote, such as a LAN, a WAN, a system bus, on-chip bus, etc. It is to be further appreciated that the use of the term client and server is for clarity in specifying who initiates a communication (the client) and who responds (the server). No hierarchy is implied unless explicitly stated. Both functions may be in a single communicating device, in which case the client-server and server-client relationship may be viewed as peer-to-peer. Thus, if two devices such as 108-1 and 104-S can both initiate and respond to communications, their communication may be viewed as peer-to-peer. Likewise, communications between 104-1 and 104-S, and 108-1 and 108-C may be viewed as peer to peer if each such communicating device is capable of initiation and response to communication.

Referring back to FIG. 2, FIG. 2 illustrates a system 200 in block diagram form, which may be representative of any of the clients and/or servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228, and communications 230. The bus system 202 may be for example, one or more of such buses as an on-chip bus, a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), etc. The CPU 204 may be a single, multiple, or even a distributed computing resource. Storage 210, may be Compact Disc (CD), Digital Versatile Disk (DVD), hard disks (HD), optical disks, tape, flash, memory sticks, video recorders, etc. Display 220 might be, for example, a Cathode Ray Tube (CRT), Liquid Crystal Display (LCD), a projection system, Television (TV), etc. Note that depending upon the actual implementation of the system, the system may include some, all, more, or a rearrangement of components in the block diagram. For example, an on-chip communications system on an integrated circuit may lack a display 220, keyboard 224, and a pointer 226. Another example may be a thin client might consist of a wireless hand held device that lacks, for example, a traditional keyboard. Thus, many variations on the system of FIG. 2 are possible.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "communicating" or "displaying" or the like, can refer to the action and processes of a computer system, or an electronic device, that manipulates and transforms data represented as physical (electronic) quantities within the electronic device or computer system's registers and memories into other data similarly represented as physical quantities within the electronic device and/or computer system memories or registers or other such information storage, transmission, or display devices.

The present invention can be implemented by an apparatus for performing the operations herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk-read only memories (CD-ROMs), digital versatile disk (DVD), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network. This communications network is not limited by size, and may range from, for example, on-chip communications to WANs such as the Internet.

The methods of the invention may be implemented using computer software. If written in a programming language conforming to a recognized standard, sequences of instructions designed to implement the methods can be compiled for execution on a variety of hardware platforms and for interface to a variety of operating systems. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; etc.

Thus, a method and apparatus for multicast handling in mixed core systems have been described.

What is claimed is:

1. A method comprising:
    creating a request from an initiator in a network having a broadcast group, wherein broadcast group registers associated with a first plurality of agents located on a chip are configured to store an associated value for the broadcast group and each agent is associated with at least one target;
    sending the request to the first plurality of agents in the network, wherein the network, including the initiator and the first plurality of agents and associated targets, is located within a single device;
    extracting for each agent a current value of the broadcast group from the request;
    analyzing for each agent the current value of the broadcast group and a previously stored value of the broadcast group register associated with each agent; and
    determining for each agent whether to accept the request for each agent based on the current value of the broadcast group and the previously stored value of the broadcast group register associated with each agent, wherein at least one agent ignores the request based on the current value of the broadcast group not matching the previously stored value of the broadcast group register associated with the at least one agent such that the at least one agent does not receive the request or at least one agent accepts the request based on the current value of the broadcast group matching the previously stored value of the broadcast group register associated with the at least one agent such that the at least one agent does receive the request.

2. The method of claim 1 wherein the broadcast group is encoded in an address.

3. The method of claim 2 wherein the encoding in the address is in a group of contiguous address bits, and wherein each agent is associated with a single target.

4. A processing system comprising a processor, which when executing a set of instructions performs the method of claim 1.

5. A machine-readable medium having stored thereon instructions, which when executed by the machine, to cause the machine to perform the method of claim 1.

6. An apparatus comprising:
    means for creating a request from an initiator in a network having a broadcast group, wherein broadcast group registers associated with a first plurality of agents located on a chip are configured to store an associated value for the broadcast group and each agent is associated with at least one target;
    means for sending the request to the first plurality of agents in the network, wherein the network, including the initiator and the first plurality of agents and associated targets, is located within a single device;
    means for extracting for each agent a current value of the broadcast group from the request;
    means for analyzing for each agent the current value of the broadcast group and a previously stored value of the broadcast group register associated with each agent; and
    means for determining for each agent whether to accept the request for each agent based on the current value of the broadcast group and the previously stored value of the broadcast group register associated with each agent, wherein at least one agent ignores the request based on the current value of the broadcast group not matching the previously stored value of the broadcast group register associated with the at least one agent such that the at least one agent does not receive the request or at least one agent accepts the request based on the current value of the broadcast group matching the previously stored value of the broadcast group register associated with the at least one agent such that the at least one agent does receive the request.

7. The apparatus of claim 6 further comprising means for encoding the broadcast group.

8. The apparatus of claim 7 further comprising means for encoding the broadcast group in an address.

9. A machine-readable medium having stored thereon information including data and instructions, which when executed by the machine to cause the machine to generate a representation of the apparatus of claim 6.

10. The method of claim 1 further comprising:
receiving a multicast; and
determining if the multicast is intended for a core;
and if so, then transmitting the multicast within the core.

11. The method of claim 10 wherein transmitting the multicast within the core further comprises cascaded multicasting within the core.

12. A processing system comprising a processor, which when executing a set of instructions, to perform the method of claim 10.

13. A machine-readable medium having stored thereon instructions, which, when executed by a machine, to cause the machine to perform the method of claim 10.

14. The method of claim 1 further comprising:
receiving a broadcast command from a first address space; and
mapping the broadcast command to at least one of a write command, and a second address space.

15. The method of claim 14 further comprising mapping the write to a third address space.

16. The method of claim 14 wherein the second address space is a plurality of different address spaces.

17. A processing system comprising a processor, which when executing a set of instructions, to perform the method of claim 15.

18. A machine-readable medium having stored thereon instructions, which, when executed by a machine, to cause the machine to perform the method of claim 14.

19. The method of claim 1 further comprising:
defining the broadcast group;
initializing the broadcast group registers in the plurality of targets;
(a) creating a request;
(b) choosing a first group of broadcast registers from the initialized broadcast group of registers;
(c) sending the request to the first group; and
repeating (a) through (c) if other requests are pending.

20. A processing system comprising a processor, which when executing a set of instructions, to perform the method of claim 19.

21. A machine-readable medium having stored thereon instructions, which when executed by a machine, to cause the machine to perform the method of claim 19.

22. The method of claim 1 further comprising:
extracting the broadcast group from the request;
expanding the broadcast group into a bit vector;
comparing the bit vector with a previously stored broadcast group register value;
determining if there is a match between the bit vector and the group register previously stored value; and
accepting the request if the bit vector and the group register previously stored value match.

23. The method of claim 22 further comprising:
examining the accepted request with respect to a core capability; and
determining if the core capability requires an operation selected from the group consisting: of mapping attributes of the core into the accepted request to match the core, creating a cascaded broadcast, mapping the accepted request into a write command, mapping the accepted request into a different address space.

24. The method of claim 1 further comprising:
receiving a nobackpressure thread; and
receiving a backpressure thread.

25. The method of claim 24 further comprising receiving the threads in a single queue.

26. The method of claim 25 wherein the threads may be received in any order.

27. The method of claim 24 further comprising receiving the nobackpressure thread in a nobackpressure queue, and receiving the backpressure thread in a backpressure queue.

28. The method of claim 27 wherein the threads may be received in any order.

29. The method of claim 24 wherein the receiving further comprises receiving over a single interface.

30. The method of claim 24 further comprising a connection identification to identify the threads.

31. The method of claim 24 further comprising receiving a plurality of nobackpressure threads.

32. The method of claim 31 wherein two or more of the plurality of nobackpressure threads are received in a single queue.

33. The method of claim 24 further comprising receiving a burst of requests through a nobackpressure queue.

34. The method of claim 24 further comprising receiving multiple bursts of requests and accepting them into a backpressure queue and nobackpressure queue.

35. The method of claim 1 further comprising:
sending a nobackpressure thread; and
sending a backpressure thread.

36. The method of claim 35 wherein the sending further comprises sending over a single interface.

37. The method of claim 1 further comprising:
configuring broadcast group registers associated with a second plurality of targets located on at least two chips;
creating a request having a broadcast group; and
broadcasting the request to the second plurality of targets located on at least two chips.

38. The method of claim 1 further comprising:
determining for each target if a match occurs between a value of the broadcast group and a previously stored value of a broadcast group register associated with each target.

* * * * *